United States Patent [19]

Lowe

[11] 4,434,386
[45] Feb. 28, 1984

[54] PROCESS AND APPARATUS FOR FORMING LAMP CAPSULES

[75] Inventor: Gary E. Lowe, Salem, Mass.

[73] Assignee: GTE Products Corporation, Stamford, Conn.

[21] Appl. No.: 334,785

[22] Filed: Dec. 28, 1981

[51] Int. Cl.³ .......................... H01J 9/00; C03B 9/00; C03B 11/00
[52] U.S. Cl. ..................................... 313/331; 445/22; 445/67; 445/27; 65/79; 65/229; 65/267; 65/305; 313/318
[58] Field of Search .................. 313/331, 318; 445/22, 445/27, 67, 69; 65/79, 267, DIG. 11, 305, 229, 230, 357

[56] References Cited

U.S. PATENT DOCUMENTS 2,491,237 12/1949 Way ................................. 445/27 X
3,617,797 11/1971 Emmasingel et al. .......... 313/331 X
4,273,568 6/1981 Scholl et al. ..................... 65/79 X
4,307,318 12/1981 Nixon ............................... 445/27 X Primary Examiner—Eugene R. LaRoche
Assistant Examiner—Vincent DeLuca
Attorney, Agent, or Firm—Edward J. Coleman

[57] ABSTRACT

A process for forming lamp capsules such as in the manufacture of miniature arc lamps wherein the bulb portion of the capsule is formed by blowing molten glass into a mold while simultaneously press sealing the lead assembly. The molding and sealing process is accomplished with heat application by means of a press foot assembly closed for a predetermined period of time such as one second to press seal the blank capsule against the lead assembly with one portion of the press foot assembly, and simultaneously to blow mold the blank capsule into another preformed portion of the press foot assembly to form the bulb portion of the lamp capsule.

12 Claims, 5 Drawing Figures

PROCESS AND APPARATUS FOR FORMING LAMP CAPSULES

BACKGROUND OF THE INVENTION

The present invention relates to a process and associated apparatus for forming lamp capsules, such as in the manufacture of miniature arc lamps, and to lamp capsules made by such a process. More particularly the present invention relates to such a process and associated apparatus using a combination molding and press sealing technique.

A lamp capsule with a lead assembly is typically formed with the use of a hollow glass blank. In the case of miniature arc lamps the glass blank typically is formed of fused quartz. One prior art technique for forming the lamp capsule is by shaping the glass blank by rolling it in contact with a contoured copper mold. Thereafter, the upper hemisphere of the capsule is press sealed. The "rolling" technique has several disadvantages one of the key of which is that the technique is very labor intensive. The technique is thus not readily adapted to automated operation. In using the "rolling" technique the capsule is shaped and is thereafter cooled requiring subsequent reheating and reshaping to complete the capsule. This prior art technique is quite apt to provide inconsistencies in the proper size, shape and form of the capsule from capsule to capsule. For example, the capsule wall thickness might vary. This then meant that the alignment of the capsule was not maintained accurately during the subsequent pressing operation. Also, if the process heat was not uniform, significant variations in capsule geometry and volume were inevitable.

SUMMARY OF THE INVENTION

Accordingly, it is an object of the present invention to provide an improved process and associated method for forming lamp capsules, such as in the manufacture of miniature arc lamps, and to provide lamp capsules made by such process Another object of the present invention is to provide a process and apparatus for forming lamp capsules which assures consistency in the forming of the capsules reducing variabilities of the product that have previously occurred. In accordance with the present invention by employing a combination molding and press sealing technique the product is made much more consistent so that there are not variations in such parameters as capsule wall thickness, capsule shape and geometry, and capsule volume.

A further object of the present invention is to provide an improved process and associated method for forming lamp capsules wherein the fill chemicals to be introduced into the capsule can be inserted using a standard weight rather than a volume calculation. This further simplifies the overall process of forming the product.

Still another object of the present invention is to provide an improved process and associated apparatus for forming lamp capsules which due to the nature of the process of a combination of molding and press sealing, there is a substantial improvement in the ease of control of temperature loading of the capsule wall and control of optical defects.

Another object of the present invention is to provide an improved process for forming lamp capsules along with an improved apparatus usable in carrying out the process and employing a press foot assembly.

To accomplish the foregoing and other objects of this invention, there is defined herein a process for forming a lamp capsule. This lamp capsule is illustrated herein as being of the type employed in the manufacture of miniature arc lamps. The lamp capsule has a lead assembly and is formed from a hollow glass blank. The process comprises the steps of, applying heat to the glass blank so that it is in a molten state, inserting the lead assembly into the glass blank at one end thereof, press sealing the glass blank in its molten state at one end thereof to seal the lead assembly therein, and substantially simultaneously with the sealing step, blow molding the glass blank to form the bulb portion of the lamp capsule. In accordance with this process it is preferred that the sealing operation take place over a predetermined period of time such as one second with the apparatus of this invention being closed during this sealing step. During this preferred one second interval the blow molding occurs by means of activation of an introgen hard blow apparatus.

In accordance with the present invention there is also provided apparatus for forming the lamp capsule with its lead assembly, from a hollow glass blank. The apparatus comprises press foot means including at least two press feet and means for controlling relative movement between the press feet between an open position and a closed molding position. The press foot means essentially forms common structure for facilitating substantially at the same time both the pressing step and the molding step. In this connection the press feet have a bulb forming section and a press seal section with the press feet adapted to be selectively moved by said means for controlling to a closed position to cause the press seal section to press seal the hollow glass blank against and about the lead assembly to form a tight seal therewith. Finally there are provided means for blow molding the hollow glass blank into the bulb forming section to form the bulb portion of the lamp capsule. The press foot means preferably comprises a common housing having means defining a semi-spherical mold at one end for forming part of the capsule bulb and means defining a press tab used in forming the seal about the lead assembly.

BRIEF DESCRIPTION OF THE DRAWINGS

Numerous other objects, features and advantages of the invention should now become apparent upon a reading of the following detailed description taken in conjunction with the accompanying drawing in which.

DETAILED DESCRIPTION

In accordance with the present invention there is provided a process and associated apparatus for the forming of lamp capsules such as used in the construction of miniature arc lamps. These capsules typically include a section for supporting a conventional lead assembly along with a bulk section of the lamp capsule. In accordance with the invention a bulb is formed by blowing the molten glass, e.g., fused quartz, into a mold so as to accurately and uniformly form a bulb section of the capsule while simultaneously press sealing the lead assembly to provide a tight seal between the glass capsule in that section and the lead assembly.

Figure 1:
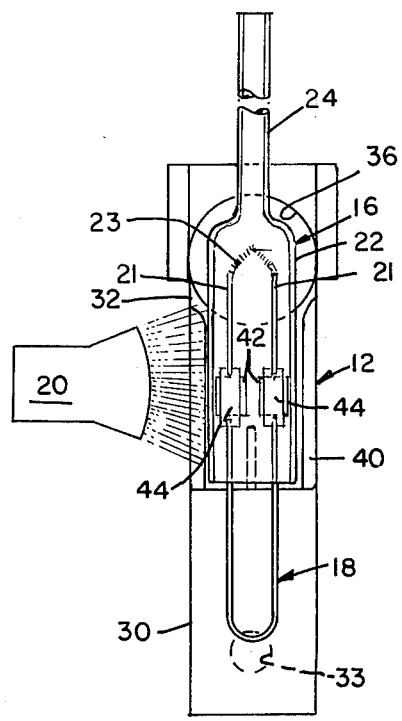
FIG. 1 is a front elevation view showing part of the press foot assembly at an initial step of the process wherein the glass blank is being brought to a molten state with the lead assembly in place.
Figure 2:
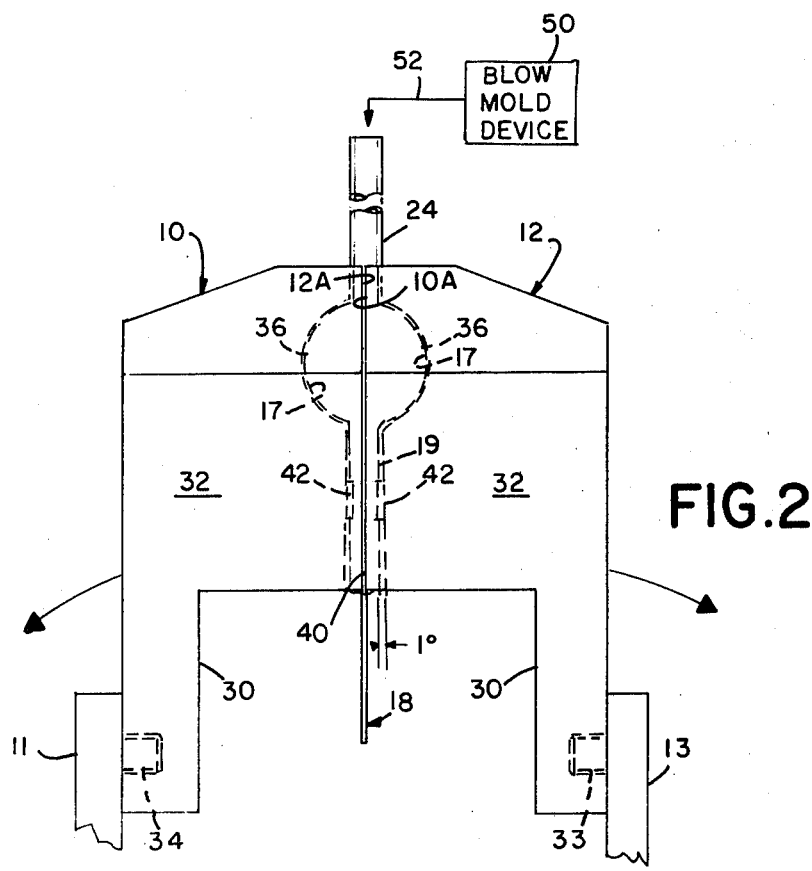
FIG. 2 is a side elevation view showing the two mold/seal halves of the press foot assembly in their closed position illustrating the pressing and molding steps in accordance with the process of this invention.
Figure 3:
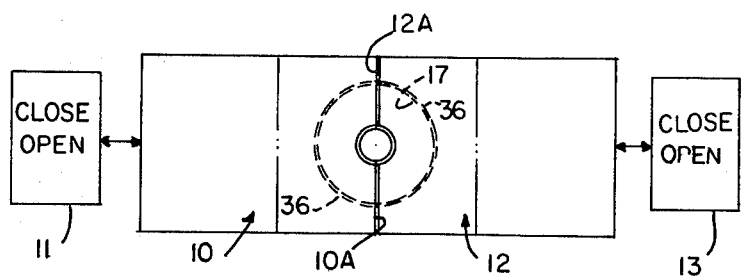
FIG. 3 is a top view of the press foot assembly in a closed position and schematically illustrating a means for opening and closing the press feet.

Referring to the drawing, the apparatus of the present invention comprises a press foot which, as depicted in FIGS. 2 and 3 are substantially identical press feet 10 and 12. The feet 10 and 12 may be supported in a conventional manner and are adapted for movement as illustrated schematically in FIG. 3 by the open/close devices 11 and 13 associated respectively with the feet 10 and 12. The movement of the feet is between open and closed positions. FIG. 1 illustrates the glass blank 16 in position associated with one of the feet such as foot 12. FIG. 1 illustrates the step wherein the lead assembly 18 is disposed in position within the glass blank 16 prior to the sealing and molding operation. FIG. 1 also illustrates the use of a heat source 20 adapted to place the glass blank 16 into a molten state in preparation for the molding and sealing operation.

The glass blank 16 illustrated in FIG. 1 has a body section 22 which is internally hollow and dimensioned so as to receive the lead assembly 18. The glass blank 16 also includes a hollow neck section 24 used in the blow molding step to be discussed hereinafter.

Each of the press feet comprise a base 30 and a main body 32. A pair of internally tapped holes 33 and 34 may be provided for providing a means for attaching feet to the means 11 and 13 illustrated in FIG. 3. The body 32 has an upper section defining semi-spherical cavity 36 which forms a mold part. FIG. 2 illustrates the cooperating cavities 36 of the feet 10 and 12. This spherical cavity is the mold in which the glass blank 16 is blown to form the bulb portion 17 of the capsule.

The main body 32 also has a lower portion forming a press seal surface 40. This surface preferably has a 1° taper. In the embodiment illustrated there are a pair of tabs 42 extending from the surface 40 and preferably adapted to be in line with the foil strips 44 of the lead assembly 18. When the feet are in their closed position as illustrated in FIGS. 2 and 3, the tabs 42 of corresponding feet are adapted to, along with the pressing surface 40, provide substantial contact with the glass blank to press seal the glass about the lead assembly. The interaction of the tabs 42 in particularly press seal about the foil strips 44 of the lead assembly 18. The result is press seal portion 19 of the capsule. In an alternative process and apparatus, the press seal has been formed without the use of tabs 42.

FIG. 2 illustrates the position of the feet when the feet are in their closed position. In this position it is noted that the facing surfaces 10A and 12A of the respective feet 10 and 12 come into contact to limit the position between the feet. Although the drawing illustrates a slight spacing between surfaces 10A and 12A, these surfaces preferably are tightly butted together when the feet are closed. The glass blank is brought to a molten state as schematically illustrated in FIG. 1 by the heat source 20 and the feet are then brought together under control of the devices 11 and 13. This occurs at a sufficient pressure to compress the glass blank about the lead assembly. The press foot assembly is maintained in this pressed position for a predetermined period of time such as one second. During that period of time the blow mold device 50 is operated. Device 50 may be a conventional device and is schematically shown in FIG. 2 as providing a blow molding pressure by way of the illustrated line 52 to the hollow neck 24 of the glass blank. Thus, the blow molding pressure causes the molten glass to expand into the cavity 36 on a controlled basis thus forming the bulb portion 17 of the capsule. This occurs rapidly and as mentioned previously while the pressure is still applied by maintaining the feet in their closed position. The blow mold device 50 may employ a Nitrogen hard blow technique. After the one second interval for pressing and molding, the feet may then be moved to their open position with the feet being spaced some predetermined distance as established by the devices 11 and 13.

FIG. 3 schematically illustrates what may be conventional devices 11 and 13 for operating the feet 10 and 12. However, it is understood that one of the feet may be maintained in a fixed position with only the other one being movable to provide the opening and closing of the feet and the opening and closing of the mold.

Figures 4, 5:
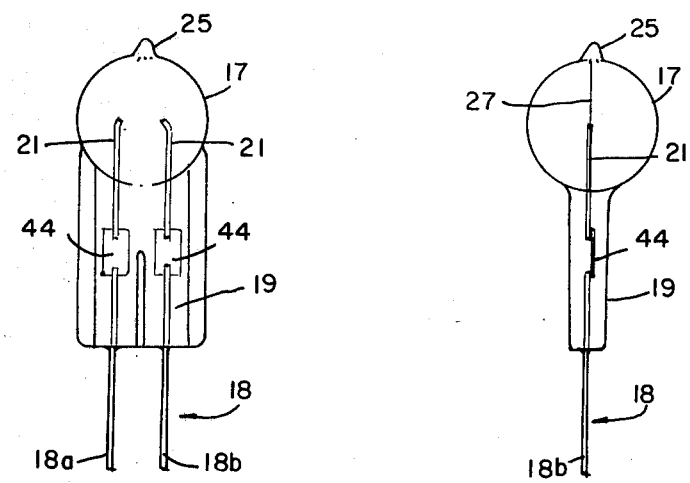
FIG. 4 is a front elevation of a lamp capsule made according to the process of this invention.
FIG. 5 is a side elevation of the lamp capsule of FIG. 4.

The finished lamp capsule, which may be formed of fused quartz, is shown in FIGS. 4 and 5 as comprising the bulb portion 17 and press seal portion 19 formed by the process described above with respect to FIGS. 1-3. The finished lead assembly 18 comprises separate external lead-in wires 18a and 18b, each connected to respective foil strips 44, e.g., molybdenum ribbons, which in turn are connected to respective internal electrodes 21. FIG. 1 shows coiled spacer 23 disposed between the electrodes 21; however, if used, this spacer 23 is removed through the open neck section 24 prior to tipping off. After the described blow molding process, the hollow bulb of the capsule is exhausted via neck 24 and filled with an appropriate starting gas, a quantity of mercury and selected additives, such as halides and metals. The bulb 17 is then hermetically sealed by tipping off the neck, or exhaust tube 24, as denoted at 25. As denoted in FIG. 5, the surface of the finished bulb 17 may exhibit a "knit line" 27 due to the peripheries of the cavities 36 on each of the mold halves.

Having described one embodiment of the present invention, it should now be apparent to those skilled in the art that numerous other embodiments are contemplated as falling within the scope of this invention. For example, the present process and apparatus may be adapted for the forming of lamp capsules of various size and shape and may be used with lead assemblies of various types.

What is claimed is:

1. A process for forming a lamp capsule having a lead assembly, from a hollow glass blank, said process comprising the steps of;
   applying heat to the glass blank so that it is in a molten state;
   inserting the lead assembly into the glass blank at one end thereof;
   press sealing the glass blank at said one end thereof to seal the lead assembly therein; and
   substantially simultaneously with said sealing step, blow molding the glass blank to form the bulb portion of the lamp capsule.

2. A process for forming a lamp capsule as set forth in claim 1 wherein said sealing and molding steps are performed over a predetermined period of time.

3. A process for forming a lamp capsule as set forth in claim 2 wherein said predetermined period of time is on the order of one second.

4. A process for forming a lamp capsule as set forth in claim 1 wherein the steps of sealing and molding are performed by means of a press foot assembly.

5. Apparatus for forming a lamp capsule having a lead assembly, from a hollow glass blank, said apparatus comprising:

press foot means including at least two press feet, means for controlling relative movement between the press feet from an open position to a closed molding position, said press feet having respective bulb forming sections and press seal sections, said press feet adapted to be selectively moved by said means for controlling to a closed position to cause the press seal sections to press seal the hollow glass blank against the lead assembly to form a tight seal thereabout, and means for blow molding the hollow glass blank into the bulb forming sections to form the bulb portion of the lamp capsule.

6. Apparatus for forming a lamp capsule as set form in claim 5 wherein each of said press feet comprises a common housing having means defining a semi-spherical bulb at one end forming a part of the capsule bulb, and means defining press tab used in forming the seal about the lead assembly.

7. Apparatus for forming a lamp capsule as set forth in claim 5 wherein the pressing and molding are controlled to occur substantially simultaneously.

8. Apparatus for forming a lamp capsule as set forth in claim 5 including means for making the glass blank molten prior to sealing and molding.

9. A lamp capsule comprising:

a glass bulb having a press seal at one end, and a lead assembly sealed through said press seal, said bulb and press seal being formed from a hollow glass blank by;

applying heat to the glass bulb so that it is in a molten state;

inserting the lead assembly into the glass blank at one end thereof;

press sealing the glass blank at one end thereof to seal the lead assembly therein; and substantially simultaneously with said sealing step, blow molding the glass blank to form the bulb portion of the lamp capsule, said blow molding resulting in a knit line about the surface of said bulb portion.

10. The lamp capsule of claim 9 wherein said glass bulb is formed of fused quartz.

11. The lamp capsule of claim 10 wherein said lamp capsule is a miniature arc lamp, and said lead assembly provides a pair of electrodes within said bulb.

12. The lamp capsule of claim 9 wherein said bulb and press seal are formed by apparatus comprising:

press foot means including at least two press feet, means for controlling the relative movement between the press feet from an open position to a closed molding position, said press feet having respective bulb forming sections and press seal sections, said press feet adapted to be respectively moved by said means for controlling to a closed position to cause the press seal sections to press seal the hollow glass blank against the lead assembly to form a tight seal thereabout, and means for blow molding the hollow glass blank into the bulb forming sections to form a bulb portion of the lamp capsule, said bulb portion exhibiting the knit line about the surface thereof due to the peripheries of said bulb forming sections of the press feet.

* * * * *